United States Patent
Bae et al.

(10) Patent No.: US 12,332,765 B2
(45) Date of Patent: Jun. 17, 2025

(54) SYSTEMS AND METHODS FOR VARIANT TESTING AT SCALE

(71) Applicant: Apple Inc., Cupertino, CA (US)

(72) Inventors: Jae Hyeon Bae, San Jose, CA (US); Kurt M. Fredericks, San Francisco, CA (US); Nicholas Kistner, Cupertino, CA (US); Andrew T. Maher, London (GB); Nihar Ranjan Hati, Santa Clara, CA (US); Mahesh Molakalapalli, Santa Clara, CA (US); Srivas Chennu, Rochester (GB); Jamie J. Martin, London (GB)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 18/167,406

(22) Filed: Feb. 10, 2023

(65) Prior Publication Data

US 2024/0103998 A1    Mar. 28, 2024

Related U.S. Application Data

(60) Provisional application No. 63/376,996, filed on Sep. 23, 2022.

(51) Int. Cl.
  *G06F 9/44*     (2018.01)
  *G06F 11/3604*  (2025.01)
(52) U.S. Cl.
  CPC ................... *G06F 11/3608* (2013.01)
(58) Field of Classification Search
  CPC .................................................. G06F 11/3608

(Continued)

(56) References Cited

U.S. PATENT DOCUMENTS 10,482,491 B2 * 11/2019 Li ..................... G06Q 30/0244
2013/0144555 A1 * 6/2013 Hathaway ............ G06F 3/0484
                                                          702/179

(Continued)

FOREIGN PATENT DOCUMENTS

WO    WO-2019143543 A2 *  7/2019 .......... G06F 11/3438

OTHER PUBLICATIONS

PCT Patent Application No. PCT/US2023/030605—International Search Report and Written Opinion dated Nov. 28, 2023.

*Primary Examiner* — Evral E Bodden
(74) *Attorney, Agent, or Firm* — DICKINSON WRIGHT RLLP

(57) ABSTRACT

This application sets forth techniques for variant testing at scale. In particular, the embodiments set forth provide systems and methods for testing, on a large-scale software application store, visual aspects of one or more variants of representative data associated with an application available through the software application store. According to some embodiments, a method may include using a subset of conversion data associated with a control object and a subset of the conversion data associated with at least one variant object to compute at least one conversion metric for the control object and at least one conversion metric for the at least one variant object. The method may also include generating a performance measurement by applying at least one statistical hypothesis testing function to the at least one conversion metric for the control object and the at least one conversion metric for the at least one variant object.

20 Claims, 7 Drawing Sheets

(58) Field of Classification Search
USPC .......................................................... 717/126
See application file for complete search history.

(56) References Cited

U.S. PATENT DOCUMENTS

| | | | |
|---|---|---|---|
| 2017/0220589 A1* | 8/2017 | Yao | G06F 16/2228 |
| 2018/0091609 A1* | 3/2018 | Xu | H04L 43/50 |
| 2020/0394054 A1* | 12/2020 | Galoso | G06F 9/451 |

* cited by examiner

SYSTEMS AND METHODS FOR VARIANT TESTING AT SCALE

CROSS-REFERENCE TO RELATED APPLICATIONS

The present application claims the benefit of U.S. Provisional Application No. 63/376,996, entitled "SYSTEMS AND METHODS FOR VARIANT TESTING AT SCALE," filed Sep. 23, 2022, the content of which is incorporated by reference herein in its entirety for all purposes.

FIELD

The described embodiments set forth techniques for variant testing at scale. In particular, the embodiments set forth provide systems and methods or testing, on a large-scale software application store, visual aspects of one or more variants of representative data associated with an application available on the software application store.

BACKGROUND

In recent years, downloading software applications (or "apps") from a software application store has become a popular method for obtaining software applications. A software application store ("app store") allows users to download a software application ("app") onto their device, such as a desktop computer or laptop computer, smartphone, etc., and then install the app on their device. Prior to downloading an app, users often browse for apps within the app store. For example, in response to a user search, the app store may provide results to the user with a particular set of representative data, such as an icon, screenshot, text description, and the like.

Periodically, an app developer may test one or more variants of such representative data. For example, the app developer may modify an icon, screen shot, and the like of a page associated with an application in an attempt to increase a conversion rate (e.g., a ratio of users visiting the page and a number of downloads of the application). In this manner, the app developer may test a number of variants to determine Which variant results in the highest conversion rate. For a large-scale software application store (e.g., with potentially millions of app developers), such testing, when being performed by any number of app developers, can be very resource intensive and may take a relatively long time to provide variant test results to the app developer.

SUMMARY

This Application sets forth techniques for variant testing at scale. In particular, the embodiments set forth provide systems and methods or testing, on a large-scale software application store, visual aspects of one or more variants of representative data associated with an application available on the software application store.

One embodiment sets forth a method for scalable variant testing that includes receiving, for a variant test associated with a control feature, variant testing input indicating user information and at least one variant feature. The method also includes identifying, based on the user information, a control object corresponding to a control feature associated with the user information and generating at least one variant object based on the at least one variant feature. The method also includes collecting conversion data for the control object and conversion data for the at least one variant object, storing, in a facts database, the conversion data for the control object and the conversion data for the at least one variant object according to a collection date, and retrieving, from the facts database, a subset of conversion data associated with the control object and a subset of the conversion data associated with the at least one variant object. The method also includes computing at least one conversion metric for the control object using the subset of conversion data associated with the control object, computing at least one conversion metric for the at least one variant object using the subset of conversion data associated with the control object, generating a performance measurement for the variant test by applying at least one statistical hypothesis testing function to the at least one conversion metric for the control object and the at least one conversion metric for the at least one variant object, and providing, at a display, the performance measurement.

Other embodiments include a non-transitory computer readable medium configured to store instructions that, when executed by a processor included in a computing device, cause the computing device to implement the methods and techniques described in this disclosure. Yet other embodiments include hardware computing devices that include processors that can be configured to cause the hardware computing devices to implement the methods and techniques described in this disclosure.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
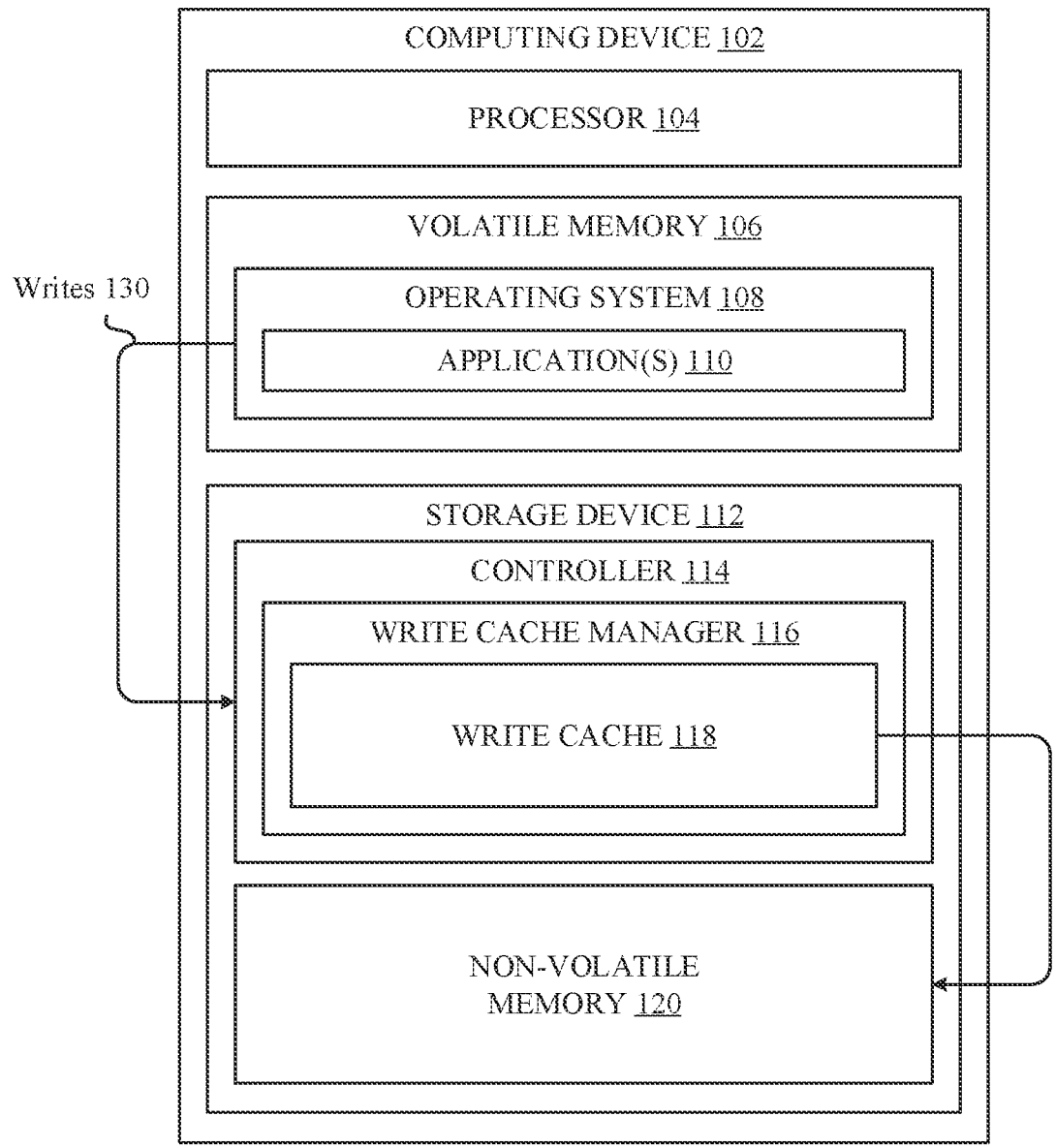
FIG. 1 illustrates a conceptual diagram of different components of a computing device that is configured to implement the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description, and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein set forth techniques for enabling large-scale variant testing to be performed in an efficient manner. In some embodiments, the systems and methods described herein may be configured to provide a conversion rate estimation by using statistical regularization to estimate conversion rates of variants more accurately in an experiment (e.g., relative to a naive estimate of conversions and/or impressions) based on the signal to noise ratio observed in the data. The systems and methods described herein may be configured to provide confidence estimation by dynamically defining a hypothesis test that evolves over the course of an individual experiment in response to the data observed during the experiment.

According to some embodiments, the systems and methods described herein may be configured to provide a futility estimation by using Monte-Carlo simulations to robustly project the propensity for a test to be futile (e.g., to estimate that significant result will not be obtainable for a period, such as within 90 days or other suitable period). The systems and methods described herein may be configured to provide a duration calculator using machine learning models and Monte-Carlo simulations to provide fast Bayesian power analyses. The systems and methods described herein may be configured to provide a data engineering approach that provides a single pass for processing all running experiments with pluggable statistical methods.

In some embodiments, the systems and methods described herein may be configured to provide an experimentation platform that provides a daily user profile, aggregate metrics over daily user profiles for a running period and apply statistical methods to the aggregated metrics. The systems and methods described herein may be configured to, in response to experiments having a user as the randomization unit, aggregate metrics at a per-user level and validate the experiment hypothesis. The systems and methods described herein may be configured to use a two sampled T-test to aggregate mean values per metric per variant.

In some embodiments, the systems and methods described herein may be configured to scan aggregated metrics multiple times without repetitive processing of user profiles. The systems and methods described herein may be configured to, when multiple experiments are being performed at the same time or substantially the same time, launch a single query per experiment that can trigger the same data scan of a daily user profile multiple times.

In some embodiments, the systems and methods described herein may be configured to receive, for a variant test associated with a control feature, variant testing input indicating user information and at least one variant feature. The systems and methods described herein may be configured to identify, based on the user information, a control object corresponding to a control feature associated with the user information. The systems and methods described herein may be configured to generate at least one variant object based on the at least one variant feature.

The systems and methods described herein may be configured to collect conversion data for the control object and conversion data for the at least one variant object. The conversion data for the control object may be generated based on a number of unique users accessing the control object, and, for each respective user associated with the number of unique users accessing the control object, one of a first value indicating that the respective user downloaded an application associated with the control object a first time the respective user accessed the control object and a second value indicating that the respective user did not download the application associated with the control object the first time the respective user accessed the control object. The conversion data for the at least one variant object may be generated based on a number of unique users accessing the variant object, and, for each respective user associated with the number of unique users accessing the variant object, one of a first value indicating that the respective user downloaded an application associated with the variant object a first time the respective user accessed the variant object and a second value indicating that the respective user did not download the application associated with the variant object the first time the respective user accessed the variant object.

The systems and methods described herein may be configured to store, in a facts database, the conversion data for the control object and the conversion data for the at least one variant object according to a collection date. The systems and methods described herein may be configured to retrieve, from the facts database, a subset of conversion data associated with the control object and a subset of the conversion data associated with the at least one variant object. The subset of conversion data associated with the control object and the subset of the conversion data associated with the at least one variant object may correspond to a collection period. The collection period may include any suitable collection period, such as one day, one week, one month, and the like.

The systems and methods described herein may be configured to compute at least one conversion metric for the control object using the subset of conversion data associated with the control object. The systems and methods described herein may be configured to compute at least one conversion metric for the at least one variant object using the subset of conversion data associated with the control object. The systems and methods described herein may be configured to generate a performance measurement for the variant test by applying at least one statistical hypothesis testing function to the at least one conversion metric for the control object and the at least one conversion metric for the at least one variant object. The performance measurement may be generated for the collection period and/or any suitable period. The at least one statistical hypothesis testing function may include a Bayesian sequential testing function, a chi-squared testing function, any other suitable statistical hypothesis testing function, or a combination thereof. The systems and methods described herein may be configured to provide, at a display, the performance measurement.

These and other embodiments are discussed below with reference to FIGS. 1-5; however, those skilled in the art will readily appreciate that the detailed description given herein with respect to these figures is for explanatory purposes only and should not be construed as limiting.

FIG. 1 illustrates a conceptual diagram 100 of a computing device 102—e.g., a smart phone, a tablet, a laptop, a desktop, a server, etc.—that may be configured to implement the various techniques described herein. As shown in FIG. 1, the computing device 102 may include a processor 104 that, in conjunction with a volatile memory 106 (e.g., a dynamic random-access memory (DRAM)) and a storage device 112 (e.g., a solid-state drive (SSD)), enables different software entities to execute on the computing device 102. For example, the processor 104 may be configured to load, from the storage device 112 into the volatile memory 106, various components for an operating system (OS) 108. In turn, the operating system 108 may enable the computing device 102 to provide a variety of useful functions, e.g., loading/executing various applications 110 (e.g., user applications). It should be understood that the various hardware components of the computing device 102 illustrated in FIG. 1 are presented at a high level in the interest of simplification, and that a more detailed breakdown is provided below in conjunction with FIG. 5.

As shown in FIG. 1, the operating system 108/applications 110 may issue write commands 130 to the storage device 112, e.g., new data writes, existing data overwrites, existing data migrations, and so on. According to some embodiments, and as shown in FIG. 1, the storage device 112 may include a controller 114 that is configured to orchestrate the overall operation of the storage device 112. In particular, the controller 114 may implement a write cache manager 116 that receives various write commands 130 and stores them into a write cache 118. The write cache manager 116 may transmit, to the non-volatile memory 120, the write commands 130 stored in the write cache 118. According to some embodiments, the non-volatile memory 120 may include log information configured to receive transactional information associated with the details associated with I/O requests processed by the controller 114.

In some embodiments, the computing device 102 may be configured to provide scalable variant testing. The scalable variant testing may be associated with variant testing on a large-scale software application store and/or any other suitable platform or application. The computing device 102 may be configured to provide a dedicated analytics platform to support monitoring tests for, for example, a product page (e.g., a page on an app store associated with a downloadable application). It should be noted that, while the systems and methods described herein are generally described in the context of a large-scale software application store, the systems and methods described herein may be applied in any suitable platform, application, and the like that utilizes variant testing.

Figure 2:
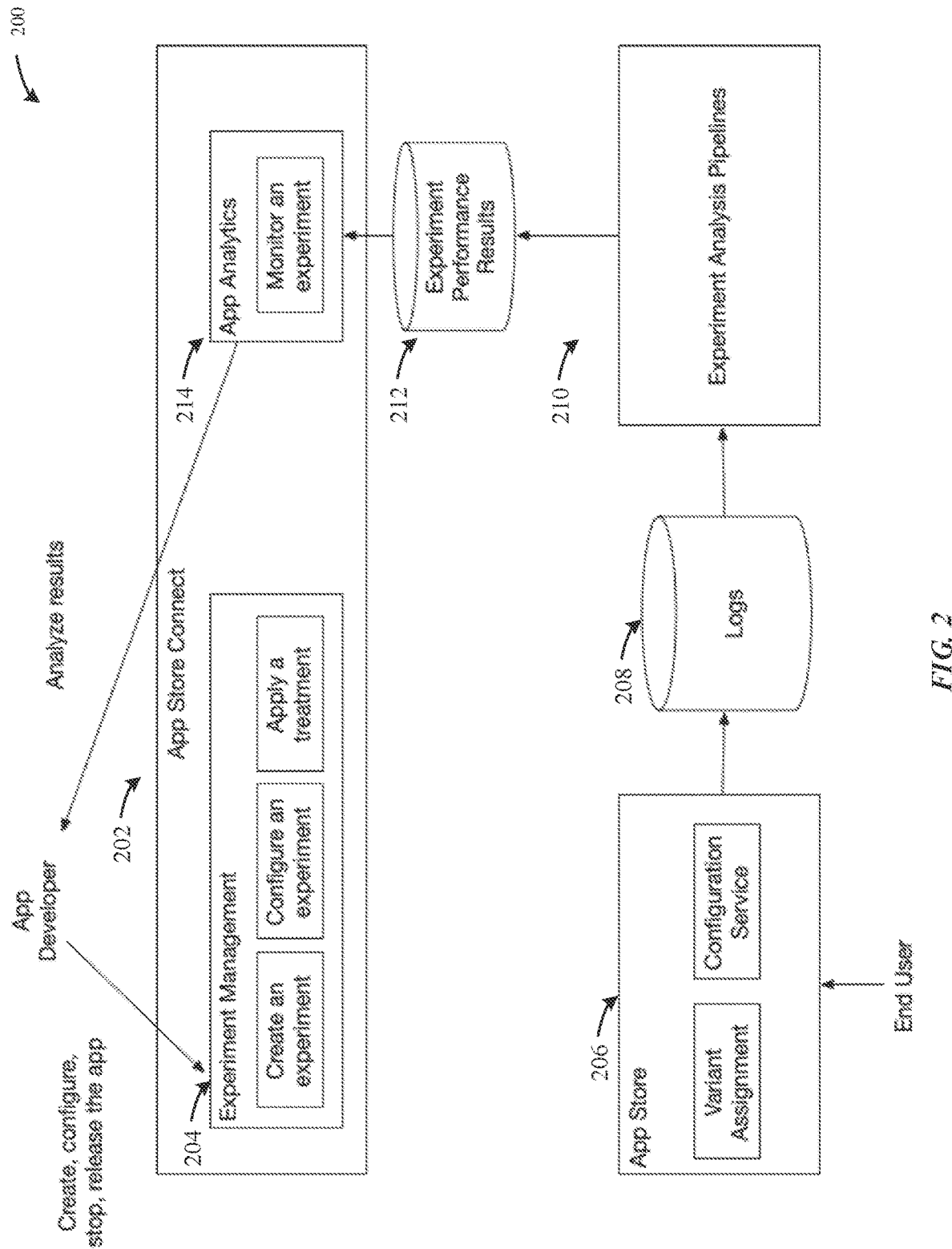
FIG. 2 illustrates a block diagram of a scalable variant testing system, according to some embodiments.

With reference to FIG. 2, a scalable variant testing system 200 is generally illustrated. The system 200 may enable app developers to manage experiments with product page optimization and to release such product pages. Client devices may interact with the experiments on the app store via an app store connect application 202. The app developer may create, configure, stop, and/or release an application on the app store via the app store connect application 202. The app developer may create one or more experiments for one or more variants of the visual aspects of the product page. For example, the app developer may use an experiment management application 204 associated with the app store connect application 202. The app developer may create an experiment, configure the experiment, and/or apply a treatment (e.g., which may be referred to herein as a variant corresponding to changes in the visual aspects of the product page). The computing device 102 may apply one or more variants to a corresponding application of the app developer on the app store 206. For example, the computing device 102 may assign a first variant to a first version of the product page, a second variant to a second version of the product page, and so on (e.g., depending on the number of variants being tested). The computing device 102 may configure each version of the product page such that each version of the product page is accessed by respective end users (e.g., users who visit the product page to potentially download the application associated with the product page).

In some embodiments, when an end user accesses the app store 206, the end user may navigate to the product page. The end user may be presented with one of a control version of the product page (e.g., which may correspond to an unchanged or original version of the product page or other suitable control version of the product page), or one of the variant versions of the product page. The end user may download the application associated with the product page or may not download the application associated with the product page. The computing device 102 may store, in a logs database 208, conversion data associated with end user visits to each of the control version of the product page and the variants of the product page. The conversion data may include a visit date, a user identifier, a product page identifier (e.g., indicating which versions of the product page an end user visited), and a first value that is set if the end user downloaded the application associated with the product page, a second value that is set if the end user did not download the application associated with the product page, and/or any other suitable data.

In some embodiments, the computing device 102 may use various experiment analysis pipelines 210 to update performance of the variant experiments. For example, the experiment analysis pipelines 210 may update performance data daily or according to any suitable period. The computing device 102 may store the performance data in an experiment performance results database 212. An app analytics application 214 may monitor various variant experiments using the performance results. The computing device 102 may provide, at display, the performance results. The app developer may view the performance results at the display.

Product page conversion rate (e.g., the ratio between users who both visited the app store 206 product page and downloaded the application associated with the product page) is a crucial metric for product page applications. Even very small improvements in product page conversion rate can make a big difference in application audience growth. The goal of product page optimization is to let developers experiment with their product pages and make data-driven decisions. While observing different conversion rates between product page variants, developers may measure how meaningful the result will be through statistical testing.

Accordingly, the computing device 102 may use numerous statistical tests to evaluate the conversion data. For example, the computing device 102 may analyze the conversion data using a chi-squared test to evaluate changes in the conversion data. The performance results determined using the chi-squared test may be generated (and be visible to the app developer) from the day after the test begins, which may allow the app developer to view the metrics every day. In order to avoid consequently inflating error rates, the computing device 102 may quantify relative evidence using Bayes factors. In this regard, the computing device 102 may be configured to support the application of various statistical methods without revamping the entire data pipelines and recomputing all datasets. Additionally, or alternatively, the computing device 102 may be configured to use per-unit statistics data to measure metrics for each variant, to build a single job to aggregate metrics for all experiments, and/or to use one or more programming languages to process large-scale data.

In some embodiments, the computing device 102 may be configured to collect raw instrumentation data to measure metrics for each variant. The computing device 102 may collect relevant logs to derive metrics per randomization unit, which constitutes the "what" or "who" assigned to the variants of the experiment. The collected raw instrumentation data may be referred to herein as "facts." The computing device 102 may store facts data based on randomization units in a table in order to scale metrics aggregation (e.g., which may help avoid scanning relatively large amounts of raw instrumentation data multiple times).

To measure the conversion rate for product page optimization, the computing device 102 may collect: which product page variant users have visited; whether the product page was the control or a treatment (e.g., variant product page); and whether those visits have led to the user downloading the application (e.g., using the first value and the second value, described herein, a true or false indicator, etc.). The computing device 102 may protect user privacy by not storing personally identifiable information, while maintaining a distinct and consistent value only throughout the experiment. Because data processing occurs daily, the computing device 102 may partition facts data by date in order to prune old data.

Deriving the above schema from raw data would be difficult and time consuming, requiring sifting through hundreds of columns of data. In addition, retrieving experiment identification information and variant identification information for the specific visitor may be significantly more difficult than retrieving columns from raw data because retrieving the correct data may depend on the system configuration scheme for the experiment and on the variant assignment service. Accordingly, the computing device 102 may gather this more complex upstream instrumentation data to help scale further processing (e.g., which may include scanning multiple data sources and applying various types of join/sort logic to obtain the final daily facts data).

Figure 3A:
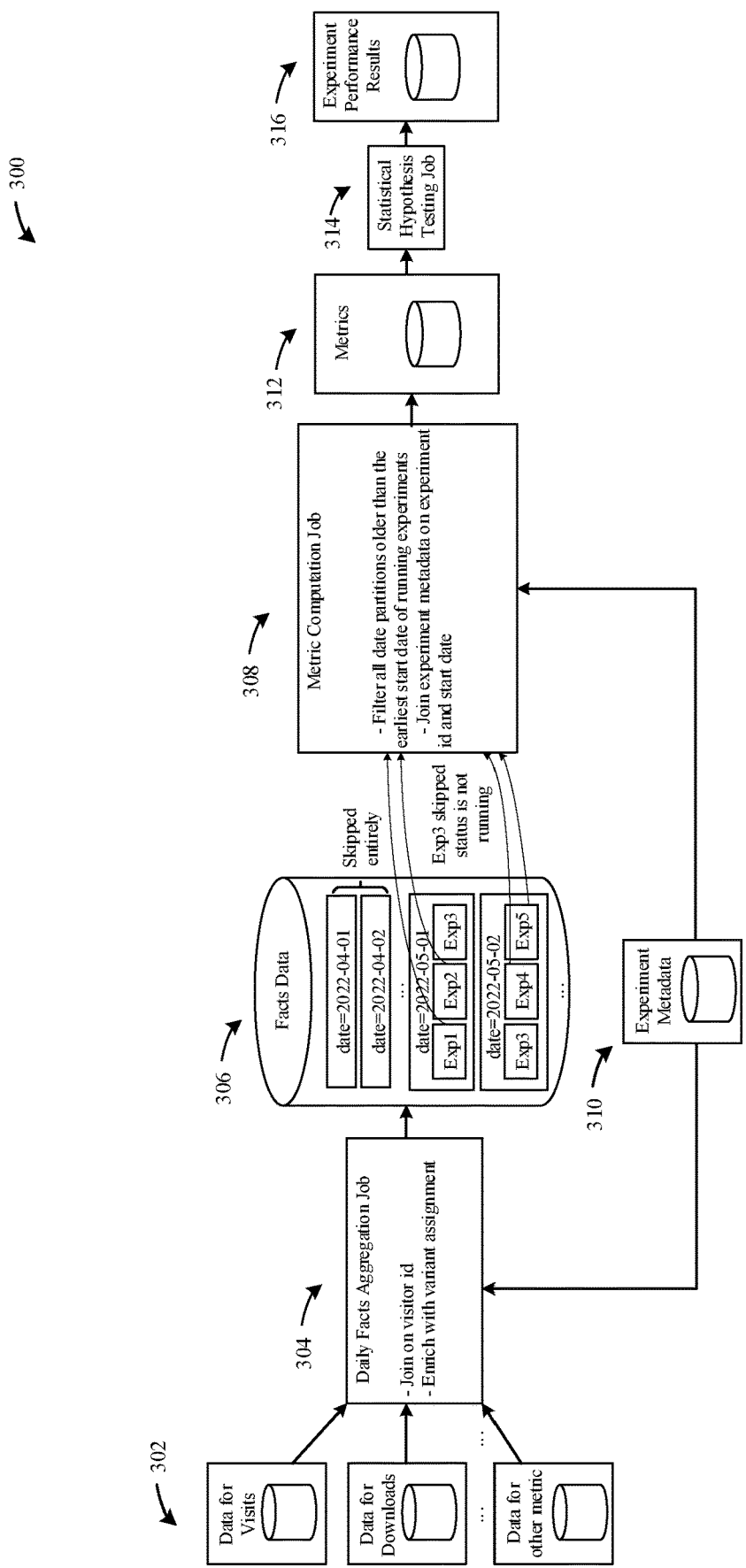
FIGS. 3A and 3B illustrate a block diagram of an alternative scalable variant testing system, according to some embodiments.

FIG. 3A generally illustrates an alternatively scalable variant testing system 300. In particular, the computing device 102 may be configured to use the system 300 to provide a single-pass metrics computation. For example, the computing device 102 may be configured to process all metrics for all active experiments in a single pass data pipeline. The computing device 102 may compute metrics per variant for active experiments. For example, the computing device 102 may use data 302, which may include data for visits to the product page, data for downloads from the product page and/or data for other metrics, to perform a daily facts aggregation job 304. The facts aggregation job 304 may perform a join on visitor identification information, enrich the data 302 with variant assignment information, and/or the like.

As described, the computing device 102 stores facts data in a facts database 306 by date. The computing device 102 may use the facts data as the input for statistical hypothesis testing. Depending on the statistical method, and the primary metric for the experiment, computed data may be formatted accordingly. For example, conversion rate tests can include two sufficient statistics: the number of distinct visitors who downloaded the app and the number of visitors who did not. The computing device 102 may be configured to compute the metrics using any suitable query language. The computing device 102 may run a single query for each experiment.

In some embodiments, the computing device 102 may persist intermediate data rather than simple queries, and may join an experiment metadata table to retrieve necessary information, including the start date. For example, the computing device 102 may perform a metric computation job 308, which may include filtering all data partitions older than the earliest start date of all running experiments, joining experiment metadata 310 on experiment identification information and state data, and/or the like.

The computing device 102 may retrieve, from the facts database 306, the earliest start date of running experiments to prune out data partitions that do not contain any relevant events. For date partitions in the range from the earliest start date to current processing date, the computing device 102 may join the experiment metadata 310 with facts indicating whether the product page was visited and whether the application was downloaded, which may be correspond to the experimentation identification information and/or the start date.

The computing device 102 may sort the facts indicating whether the product page was visited and whether the application was downloaded by the experiment identification information, which may be stored as the first sorting column to improve performance of a loin on the experimentation identification information. The computing device 102 may be configured to use common table expressions written as functions to be unit-tested. The computing device 102 may cache or persist intermediate data to avoid re-computing such data. Additionally, or alternatively, the computing device 102 may be configured to compute multiple metrics 312 in parallel.

In some embodiments, the computing device 102 may be configured to provide intermediate data materialization. The computing device 102 may perform an aggregation job for all experiments. The computing device 102 may use results of metrics 312 to perform one or more statistical hypothesis testing jobs 314. For example, the computing device 102 may use Bayesian sequential testing of conversion rates by comparing the same metrics of metrics 312 evolving on a daily basis starting from the first day of the experiment. Updating or adding metric definitions can be done by minimal changes of pipeline implementation if dependencies between metric implementation and upstream input data can be broken down by having a per-unit facts table.

Figure 3B:
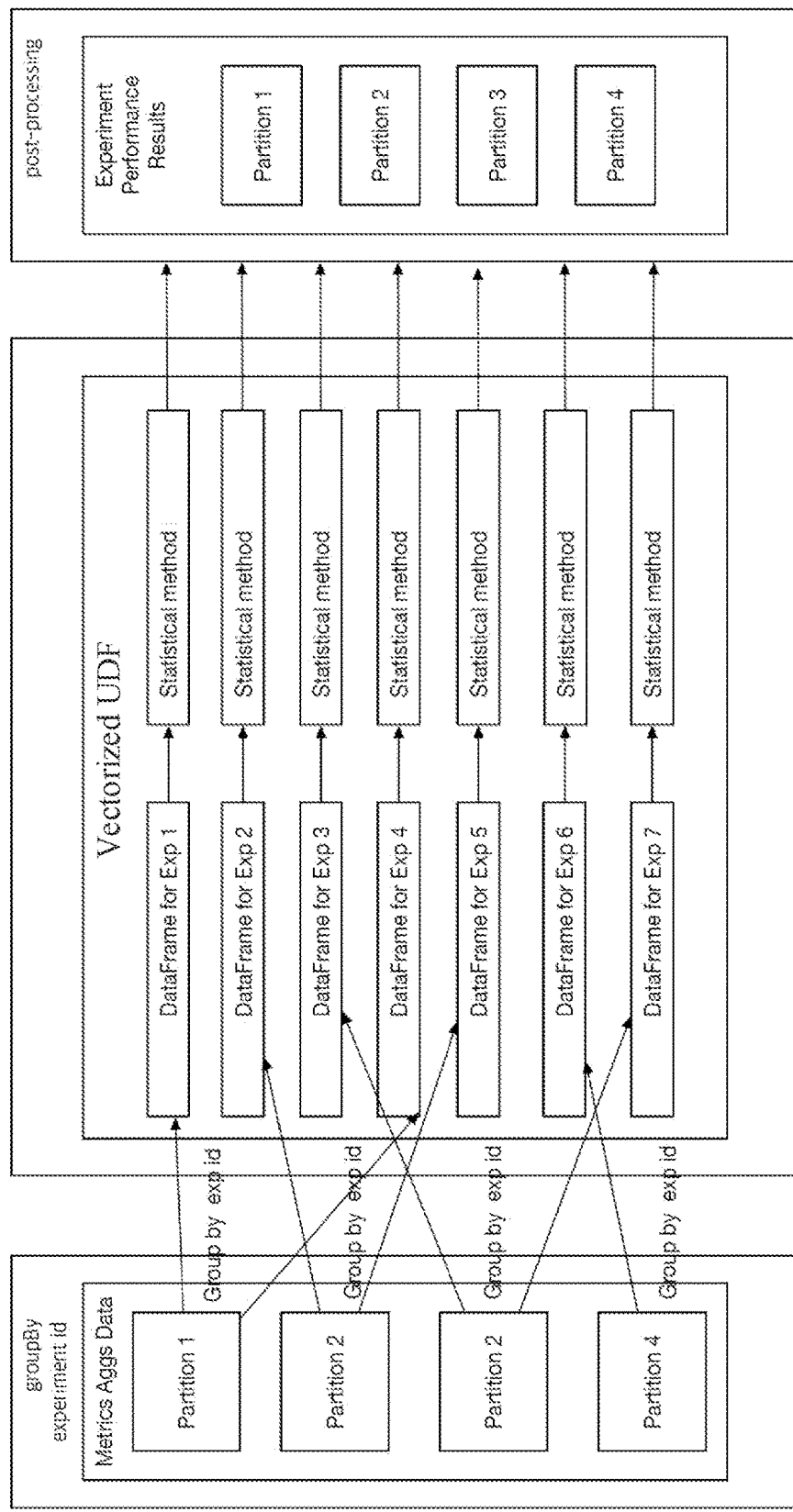

As illustrated in the conceptual diagram 350 of FIG. 3B, the computing device 102 may be configured to simplify statistical hypothesis testing as: reading metrics data; grouping by the experimentation identification information element; and applying user defined functions (UDF) through an application programming interface (API). The computing device 102 may be configured to reference experiment metadata, such as the number of variants, start date, and significance level, while running one or more statistical computations. The computing device 102 may enrich DataFrame data for corresponding experiments (e.g., indicated in FIG. 3B as Exp 1, Exp 2, and so on) with required elements before passing it to the UDF. The UDF may be configured as a shared library, and the library can be integrated into postprocessing tasks.

In some embodiments, the computing device 102 may aggregate randomization unit level metrics. For product page optimization, the computing device 102 may provide visit and download information per user, indicating the variants in use. The computing device 102 may partition the set of per-unit statistics by date to support tracking experiment performance results and pruning outdated data, which may enable more flexibility in metrics implementation and may allow for adoption of various statistical methods for hypothesis testing.

In some embodiments, the computing device 102 may scale pipelines with small units of compute tasks instead of many fine-grained tasks, which may provide for improved scaling and may prevent bottlenecks in a distributed computing environment, such as query-execution resource planning, reading the same instrumentation data repeatedly, and filtering excessively. In some embodiments, the computing device 102 may use scalable programming language and a UDF to bridge the gap between data science and engineering without creating performance concerns.

In some embodiments, the computing device 102 may receive, for a variant test associated with a control feature, variant testing input indicating user information and at least one variant feature. The computing device 102 may identify, based on the user information, a control object corresponding to a control feature associated with the user information. The computing device 102 may generate at least one variant object based on the at least one variant feature.

The competing device 102 may collect conversion data for the control object and conversion data for the at least one variant object. The conversion data for the control object may be generated based on a number of unique users accessing the control object, and, for each respective user associated with the number of unique users accessing the control object, one of a first value indicating that the respective user downloaded an application associated with the control object a first time the respective user accessed the control object and a second value indicating that the respective user did not download the application associated with the control object the first time the respective user accessed the control object. The conversion data for the at least one variant object may be generated based on a number of unique users accessing the variant object, and, for each respective user associated with the number of unique users accessing the variant object, one of a first value indicating that the respective user downloaded an application associated with the variant object a first time the respective user accessed the variant object and a second value indicating that the respective user did not download the application associated with the variant object the first time the respective user accessed the variant object. The conversion data may be stored in the facts database 306.

The computing device 102 may retrieve, from the facts database 306, a subset of conversion data associated with the control object and a subset of the conversion data associated with the at least one variant object. The subset of conversion data associated with the control object and the subset of the conversion data associated with the at least one variant object may correspond to a collection period. The collection period may include any suitable collection period, such as one day, one week, one month, and the like.

The systems and methods described herein may be configured to compute at least one conversion metric for the control object using the subset of conversion data associated with the control object. The computing device 102 may compute at least one conversion metric for the at least one variant object using the subset of conversion data associated with the control object. The computing device 102 may store each conversion metric in the metrics 312. The computing device 102 may generate a performance measurement for the variant test by applying at least one statistical hypothesis testing function (e.g., associated with the statistical hypothesis testing job 314) to the at least one conversion metric for the control object and the at least one conversion metric for the at least one variant object. The performance measurement may be generated for the collection period and/or any suitable period. The at least one statistical hypothesis testing function may include a Bayesian sequential testing function, a chi-squared testing function, any other suitable statistical hypothesis testing function, or a combination thereof.

The computing device 102 may store the performance result in an experimental performance results database 316. The computing device 102 may provide, at a display (e.g., including any suitable display, such as those described herein), the performance measurement.

In some embodiments, the computing device 102 may perform the methods described herein. However, the methods described herein as performed by the computing device 102 are not meant to be limiting, and any type of software executed on a processor can perform the methods described herein without departing from the scope of this disclosure. For example, a processor executing software within another computing device, can perform the methods described herein.

Figure 4A:
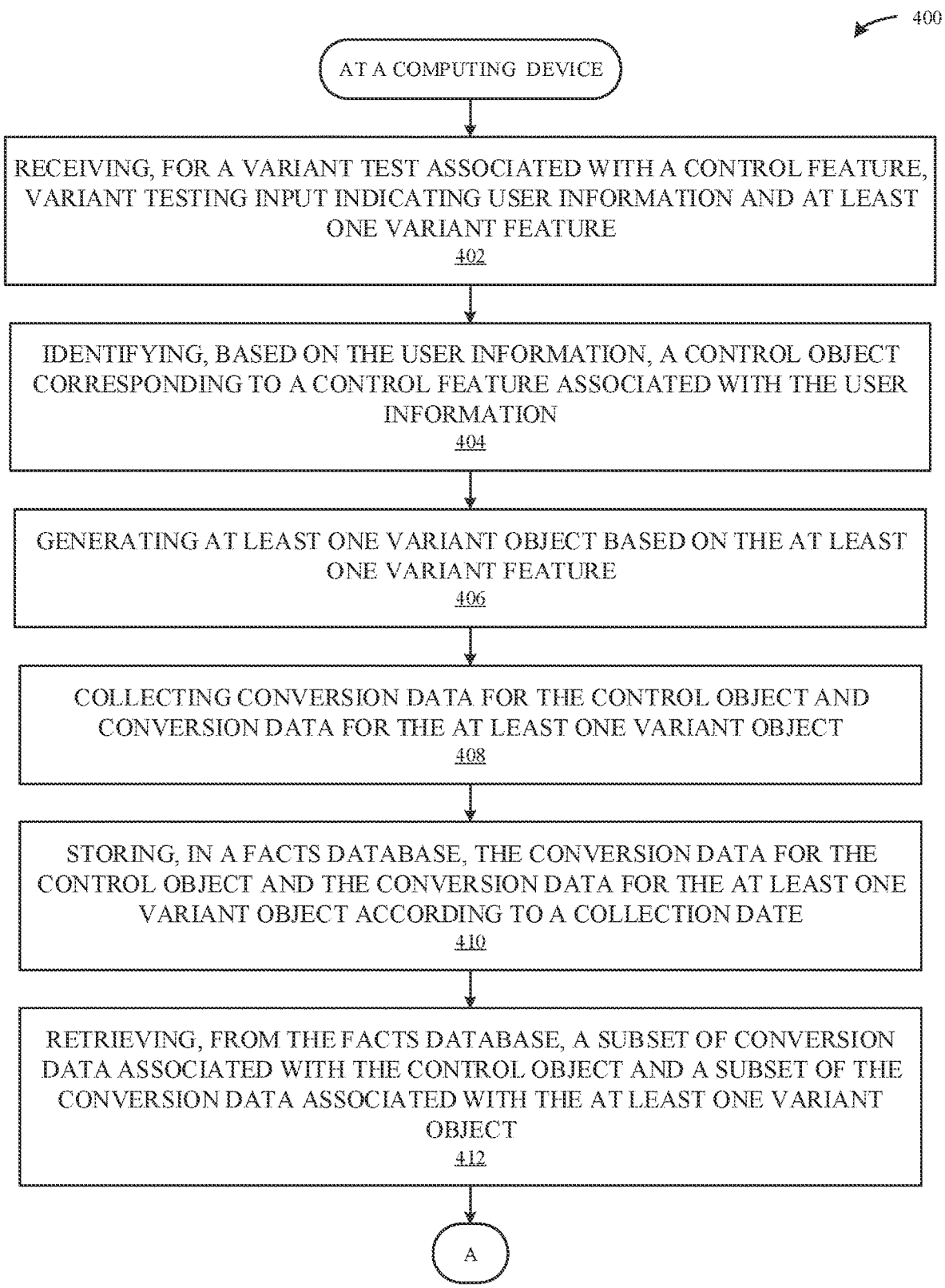
FIGS. 4A and 4B illustrate a scalable variant testing method, according to some embodiments.
Figure 4B:
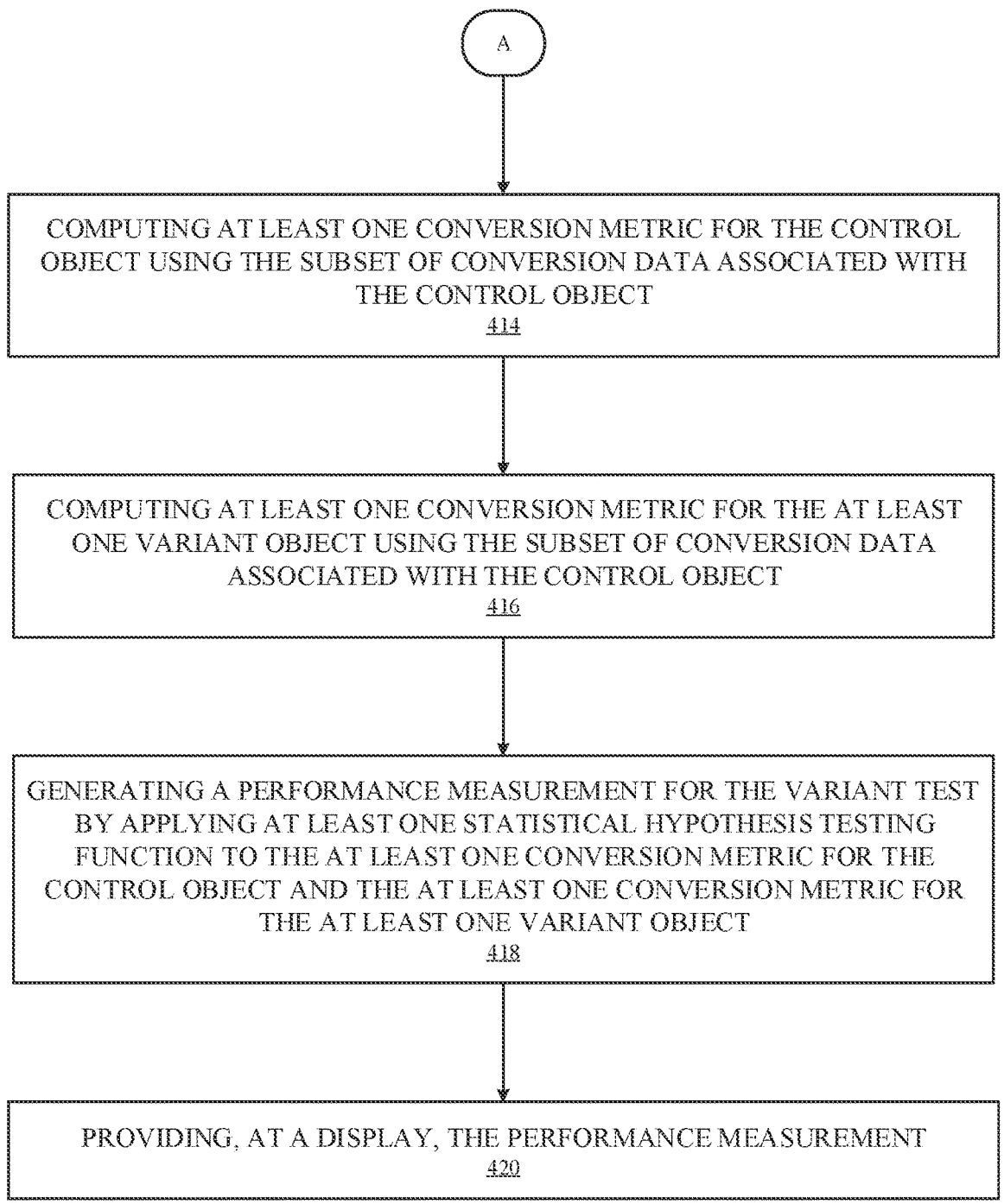

FIGS. 4A and 4B illustrate a scalable variant testing method 400, according to some embodiments. At step 402, the method 400 receives, for a variant test associated with a control feature, variant testing input indicating user information and at least one variant feature.

At step 404, the method 400 identifies, based on the user information, a control object corresponding to a control feature associated with the user information. At step 406, the method 400 generates at least one variant object based on the at least one variant feature. At step 408, the method 400 collects conversion data for the control object and conversion data for the at least one variant object. At step 410, the method 400 stores, in a facts database, the conversion data for the control object and the conversion data for the at least one variant object according to a collection date. At step 412, the method 400 retrieves, from the facts database, a subset of conversion data associated with the control object and a subset of the conversion data associated with the at least one variant object.

Turning now to FIG. 4B, at step 414, the method 400 computes at least one conversion metric for the control object using the subset of conversion data associated with the control object. At step 416, the method computes at least one conversion metric for the at least one variant object using the subset of conversion data associated with the control object. At step 418, the method 400 generates a performance measurement for the variant test by applying at least one statistical hypothesis testing function to the at least one conversion metric for the control object and the at least one conversion metric for the at least one variant object. At step 420, the method 400 provides, at a display, the performance measurement.

Figure 5:
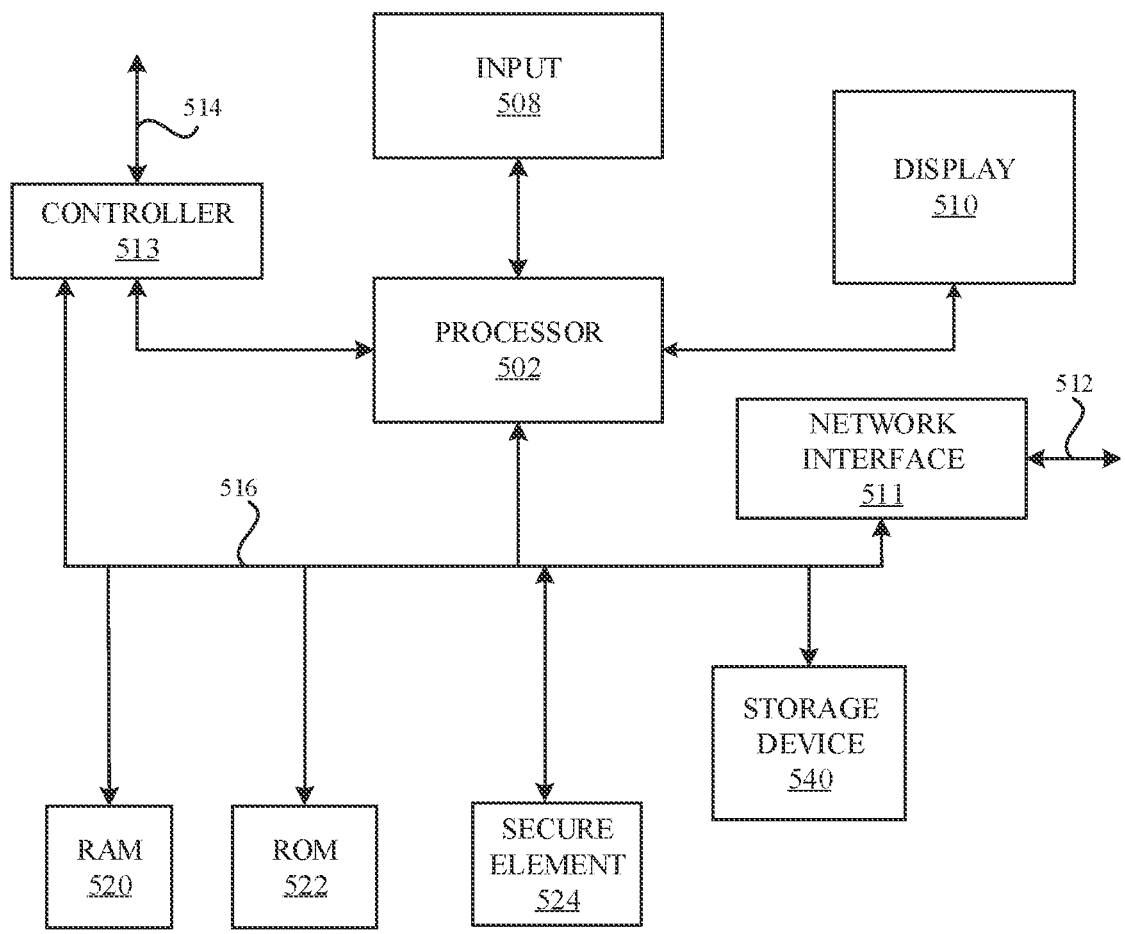
FIG. 5 illustrates a block diagram of exemplary elements of a mobile wireless device, according to some embodiments.

FIG. 5 illustrates a detailed view of a representative computing device 500 that can be used to implement various methods described herein, according to some embodiments. In particular, the detailed view illustrates various components that can be included in a computing device 102. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 that can be controlled by the processor 502 to display information to the user. A data bus 516 can facilitate data transfer between at least a storage device 540, the processor 502, and a controller 513. The controller 513 can be used to interface with and control different equipment through an equipment control bus 514. The computing device 500 can also include a network/bus interface 511 that communicatively couples to a data link 512. In the case of a wireless connection, the network/bus interface 511 can include a wireless transceiver.

The computing device 500 also includes a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities, or processes to be executed in a non-volatile manner. The RAM 520 can provide volatile data storage, and stores instructions related to the operation of the computing device 500. The computing device 500 can further include a secure element (SE) 524 for cellular wireless system access by the computing device 500.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

Regarding the present disclosure, it is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method, comprising:

generating at least one variant object based on at least one variant feature indicated by variant testing input associated with a variant test, wherein the variant test is associated with a control object and a software application;

collecting first and second conversion data for the control object and the at least one variant object, respectively, wherein the first and second conversion data is based on first time downloads of the software application by users who access the control object and the at least one variant object;

storing, in a facts database, the first and second conversion data according to a collection date;

retrieving, from the facts database, a first and second subsets of the first and second conversion data, respectively;

computing at least one first conversion metric using the first subset and at least one second conversion metric using the second subset;

generating, for a collection period associated with the first and second subsets, a performance measurement for the variant test by applying at least one statistical hypothesis testing function to the at least one first conversion metric and the at least one second conversion metric; and providing, at a display, the performance measurement.

2. The method of claim 1, wherein the first conversion data is generated based on a number of unique users accessing the control object, and includes, for each respective user associated with the number of unique users accessing the control object, a first value indicating that the respective user downloaded the software application a first time the respective user accessed the control object, or a second value indicating that the respective user did not download the software application associated the first time the respective user accessed the control object.

3. The method of claim 1, wherein the second conversion data is generated based on a number of unique users accessing the at least one variant object, and includes, for each respective user associated with the number of unique users accessing the at least one variant object, a first value indicating that the respective user downloaded the software application a first time the respective user accessed the at least one variant object, or a second value indicating that the respective user did not download the software application the first time the respective user accessed the at least one variant object.

4. The method of claim 1, wherein the first and second subsets of the first and second conversion data correspond to a second collection period.

5. The method of claim 4, wherein the collection period includes one day.

6. The method of claim 4, wherein the performance measurement is generated for the collection period.

7. The method of claim 1, wherein the at least one statistical hypothesis testing function includes a Bayesian sequential testing function.

8. The method of claim 1, wherein the at least one statistical hypothesis testing function includes a chi-squared testing function.

9. A system for scalable variant testing, the system comprising:
- at least one memory configured to store instructions; and
- at least one processor configured to receive the instructions from the at least one memory and execute the instructions to cause the system to perform operations including:
- generate at least one variant object based on at least one variant feature indicated by variant testing input associated with a variant test that is associated with a control object and a software application;
- collect first and second conversion data for the control object and the at least one variant object, respectively, wherein the first and second conversion data is based on first time downloads of the software application by users who access the control object and the at least one variant object;
- store, in a facts database, the first and second conversion data according to a collection date;
- retrieve, from the facts database, a first and second subsets of the first and second conversion data, respectively;
- compute at least one first conversion metric using the first subset and at least one second conversion metric using the second subset;
- generate, for a collection period associated with the first and second subsets, a performance measurement for the variant test by applying at least one statistical hypothesis testing function to the at least one first conversion metric and the at least one second conversion metric; and
- provide, at a display, the performance measurement.

10. The system of claim 9, wherein the first conversion data is generated based on a number of unique users accessing the control object, and includes, for each respective user associated with the number of unique users accessing the control object, a first value indicating that the respective user downloaded the software application a first time the respective user accessed the control object, or a second value indicating that the respective user did not download the software application associated the first time the respective user accessed the control object.

11. The system of claim 9, wherein the second conversion data is generated based on a number of unique users accessing the at least one variant object, and includes, for each respective user associated with the number of unique users accessing the at least one variant object, a first value indicating that the respective user downloaded the software application a first time the respective user accessed the at least one variant object, or a second value indicating that the respective user did not download the software application the first time the respective user accessed the at least one variant object.

12. The system of claim 9, wherein the first and second subsets of the first and second conversion data correspond to a second collection period.

13. The system of claim 12, wherein the collection period includes one day.

14. The system of claim 12, wherein the performance measurement is generated for the collection period.

15. The system of claim 9, wherein the at least one statistical hypothesis testing function includes a Bayesian sequential testing function.

16. The system of claim 9, wherein the at least one statistical hypothesis testing function includes a chi-squared testing function.

17. A non-transitory computer-readable storage medium configured to store instructions that are executable by at least one processor included in a computing device and cause the computing device to provide scalable variant testing, by carrying out steps that include:
- generating at least one variant object based on at least one variant feature indicated by variant testing input associated with a variant test that is associated with a control object and a software application;
- collecting first and second conversion data for a control object and the at least one variant object, respectively, wherein first and second conversion data is based on first time downloads of software application by users who access the control object and the least one variant object;
- storing, in a facts database, the first and second conversion data for the control object and the at least one variant object according to a collection date;
- retrieving, from the facts database, a subset of conversion data associated with the control object and a subset of the conversion data associated with the at least one variant object;
- computing at least one conversion metric for the control object using the subset of conversion data associated with the control object;
- computing at least one conversion metric for the at least one variant object using the subset of conversion data associated with the control object;
- generating, for a collection period associated with the subset of conversion data associated with the control object and the subset of the conversion data associated with the at least one variant object, a performance measurement for the variant test by applying at least one statistical hypothesis testing function to the at least one conversion metric for the control object and the at least one conversion metric for the at least one variant object; and
- providing, at a display, the performance measurement.

18. The non-transitory computer-readable storage medium of claim 17, wherein the collection period includes one day.

19. The non-transitory computer-readable storage medium of claim 17, wherein the at least one statistical hypothesis testing function includes a Bayesian sequential testing function.

20. The non-transitory computer-readable storage medium of claim 17, wherein the at least one statistical hypothesis testing function includes a chi-squared testing function.

* * * * *

UNITED STATES PATENT AND TRADEMARK OFFICE
CERTIFICATE OF CORRECTION

PATENT NO. : 12,332,765 B2
APPLICATION NO. : 18/167406
DATED : June 17, 2025
INVENTOR(S) : Jae Hyeon Bae et al.

Page 1 of 1

It is certified that error appears in the above-identified patent and that said Letters Patent is hereby corrected as shown below:

In the Specification

At Column 1, Line 43: "determine Which variant results in the highest conversion" should read -- determine which variant results in the highest conversion --.

At Column 3, Line 25: "to estimate con version rates of variants more accurately in" should read -- to estimate conversion rates of variants more accurately in --.

At Column 3, Line 29: "herein may be configured to provide confidence estimation" should read -- herein may be configured to provide a confidence estimation --.

At Column 8, Line 26-27: "column to improve performance of a loin on the experimentation" should read -- column to improve performance of a join on the experimentation --.

At Column 8, Line 61: "integrated into postprocessing tasks." should read -- integrated into post-processing tasks. --.

At Column 9, Line 23: "The competing device 102 may collect conversion data" should read -- The computing device 102 may collect conversion data --.

Signed and Sealed this
Twenty-eighth Day of October, 2025

John A. Squires
*Director of the United States Patent and Trademark Office*